(12) United States Patent  (10) Patent No.: US 7,548,966 B2
Heng  (45) Date of Patent: Jun. 16, 2009

(54) MULTI-LAYER USER MANAGEMENT METHOD FOR MULTICASTING PROXY

(75) Inventor: Zhi Heng, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 740 days.

(21) Appl. No.: 10/628,878

(22) Filed: Jul. 28, 2003

(65) Prior Publication Data

US 2004/0059803 A1  Mar. 25, 2004

(30) Foreign Application Priority Data

Aug. 7, 2002  (CN) ................................ 02 1 25984

(51) Int. Cl.
G06F 15/16 (2006.01)
G06F 15/177 (2006.01)
G06F 15/173 (2006.01)

(52) U.S. Cl. ........................ 709/223; 709/220; 709/231; 709/224; 709/205

(58) Field of Classification Search ................. 709/220, 709/224, 231, 223
See application file for complete search history.

(56) References Cited

U.S. PATENT DOCUMENTS

| | | | | |
|---|---|---|---|---|
| 5,963,556 | A * | 10/1999 | Varghese et al. | 370/401 |
| 6,046,989 | A * | 4/2000 | Takahashi | 370/312 |
| 6,185,698 | B1 | 2/2001 | Wesley et al. | |
| 6,330,601 | B1 * | 12/2001 | French et al. | 709/224 |
| 6,684,331 | B1 * | 1/2004 | Srivastava | 713/163 |
| 2002/0004827 | A1 * | 1/2002 | Ciscon et al. | 709/223 |
| 2005/0021802 | A1 * | 1/2005 | Chen et al. | 709/231 |

FOREIGN PATENT DOCUMENTS

| | | |
|---|---|---|
| EP | 1 111 892 A2 | 6/2001 |
| EP | 1 185 130 A2 | 3/2002 |
| JP | 2000-134208 A | 5/2000 |
| JP | 2000-181824 A | 6/2000 |

OTHER PUBLICATIONS

Rami Lehtonen, Jarmo Harju; "Access network independent service control system for stream based service"; Proceeding of the Eunice 2000; 'Online!; Sep. 2000; pp. 1-8; XP002258177; Enschede, Netherlands; Retrieved from the Internet: <URL:http://citeseer.nj.nec.com/cache/papers/cs/21998/http:zSzzSzwwwtgs.cs.utwente.n1zSzeunicezSzsummerschoolzSzpaperszSzpaper2-1.pdf/access-network-independent-service.pdf> 'retrieved on Oct. 16, 2003!
Rami Lehtonen, Jarmo Harju; "Distributed Service Platform for Managing Stream Services"; Springer Verlag, Berlin, Heidelberg; 'Online! 2001; pp. 660-673; XP002258178; Retrieved from the Internet: <URL:http://www.springerlink.com/openurl.asp?genre=article&issn=0302-9743&volume=2170&spage=660> 'retrieved on Oct. 16, 2003!

* cited by examiner

*Primary Examiner*—William C Vaughn, Jr.
*Assistant Examiner*—Umar Cheema

(57) ABSTRACT

Disclosed is a multi-layer user management method for multicasting. First, a user management for multicasting groups is divided into three layers: management at an interface layer for controlling multicasting characteristics corresponding to interfaces, management at a data link layer for controlling multicasting characteristics corresponding to data links and management at user layer for controlling multicasting characteristics corresponding to particular users, and at each layer control blocks that are respectively comprised of data corresponding to said each layer are set. Secondly, a data relationship among the three layers of control blocks is established. Lastly, particular users' joining or leaving of the multicasting group are managed through the data relationship among the three layers of control blocks.

11 Claims, 1 Drawing Sheet

MULTI-LAYER USER MANAGEMENT METHOD FOR MULTICASTING PROXY

CROSS-REFERENCE TO RELATED APPLICATIONS

This application claims the benefit of Chinese Patent Application No. 02125984.4 filed on Aug. 7, 2002. The disclosure of the above application is incorporated herein by reference.

FIELD OF THE INVENTION

The present invention relates to a user management method for multicasting proxy in data communications, specifically to a multi-layer user management method for multicasting proxy.

BACKGROUND OF THE INVENTION

In prior art, multicasting can only be controlled at interface layer, but not at data link layer or user layer. In this way, members of a multicasting group are interfaces or sub-interfaces, so a multicasting packet sender can only forward multicasting packets to interfaces without knowing anything about who will receive the multicasting packets. It is not under control whether a particular user belonging to a multicasting group has the right to send multicasting packets. Apart from that, a particular user who has sent some multicasting packets can't be precisely charged. Therefore, user level management can't be achieved at present, and it is inconvenient in practice.

SUMMARY OF THE INVENTION

It is an object of the invention to provide a multi-layer user management method for multicasting proxy. With this method, multicasting groups can be controlled more effectively and user layer management can be achieved. For example, this method can control the right of members of multicasting groups to receive the multicasting data and apply other applications, and can charge a particular user of a multicasting group for his multicasting applications.

To achieve this object, a method according to the present invention comprises:

(1) dividing a user management for multicasting groups into three layers: management at an interface layer for controlling multicasting characteristics corresponding to interfaces, management at a data link layer for controlling multicasting characteristics corresponding to data links and management at user layer for controlling multicasting characteristics corresponding to particular users, and at each layer setting control blocks that are respectively comprised of multicasting characteristic data corresponding to said each layer;

(2) establishing a data relationship among the three layers of control blocks; and (3) managing a user's joining or leaving a multicasting group using the data relationship among the three layers of control blocks.

In Step (2), the data relationship can be established through a three-dimensional linking-list data structure which links each control block with linking-lists or arrays. Three dimensions of the three-dimensional linking-list data structure are: data link including interface, multicasting group and user IP.

It can be seen that the present invention can control multicasting groups at three layers: the interface layer, the data link layer and the user layer, other than only at the interface layer in prior art, so relative to the prior art, the present invention can manage multicasting groups more effectively and flexibly. In addition, the two-layer link layer control blocks and the user layer control blocks are new added in the invention, and the data relationship among three layers of control blocks is established, so the invention can manage every particular user of multicasting groups. For example, the management of authentication and charging every particular user is hence provided. In this way, the management for multicasting groups in the invention is more profound and practicable than that in the prior art.

Meanwhile, network resources of communication service providers can be effectively utilized with the invention, for example, only one datagram can be sent for all users of the same multicasting group at the same data link layer. So, the network resources can be greatly saved.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

Figure 1:
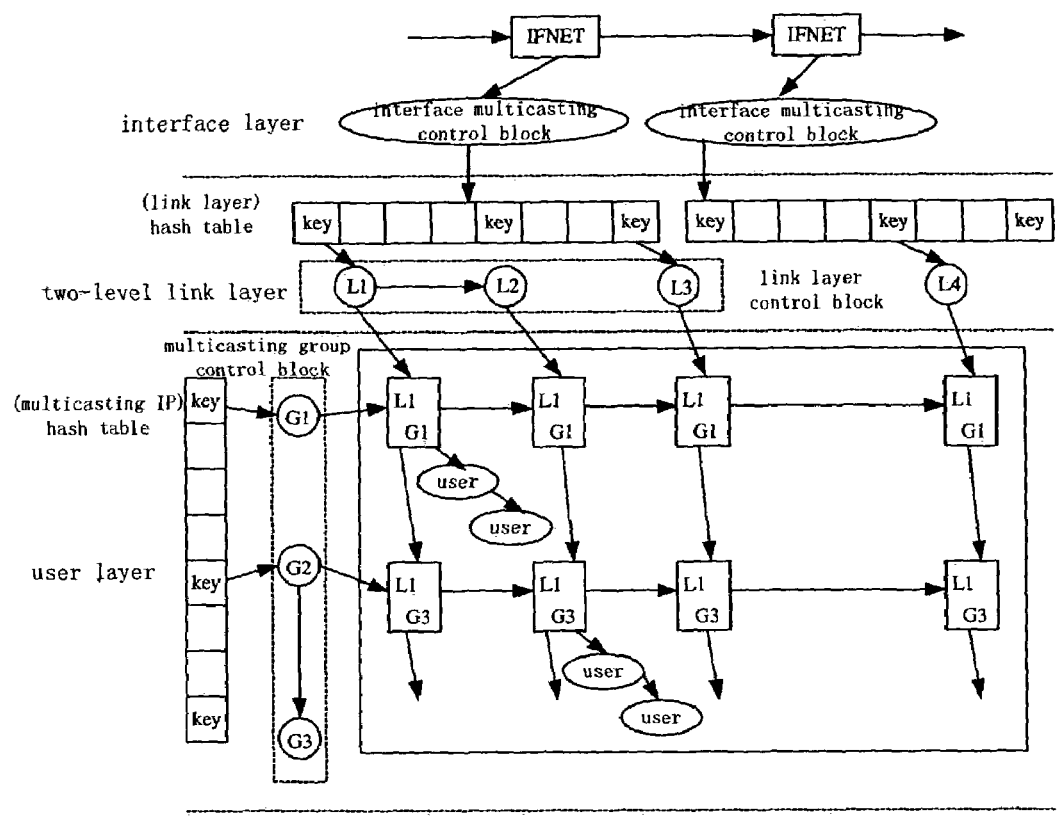
FIG. 1 shows a three-dimensional linking-list control diagram for implementing multi-layer user management for multicasting proxy according to the present invention.

The following description of the preferred embodiment(s) is merely exemplary in nature and is in no way intended to limit the invention, its application, or uses.

The invention will be described in more detail hereinafter, with reference to the accompanying drawing and embodiments.

To achieve the object of multi-layer user management for multicasting proxy, the invention comprises the following main steps:

(1) dividing the user management for multicasting groups into the management at interface layer, the management at data link layer and the management at user layer, and respectively setting a control block or blocks at every layer, wherein a control block is indeed a data structure that respectively comprises the multicasting characteristics of multicasting groups corresponding to that layer in fact;

(2) establishing a data relationship among the above-mentioned control blocks, that is, a certain data link layer control block can be found from all interface layer control blocks and a certain user layer control block can be found from all data link layer control blocks; and (3) performing user management for users, such as authentication, authorization and charge etc., with the data relationship among three kinds of control blocks.

Among the three layers of control blocks according to the present invention, the interface layer control block is the interface/sub-interface control block according to the prior art. The interface layer control blocks are used to manage multicasting characteristics of every interface and sub-interface in a system. This management includes: whether to allow multicasting application, whether to allow multicasting applications at a user side or a network side, whether to allow tying multicasting resources or multicasting groups, limiting the number of members of a multicasting group or the number of multicasting groups etc.

The data link layer control blocks are used to manage multicasting characteristics corresponding to the data link layer of a network. A data link here is a shared link where all users applying multicasting group applications located, such as a Virtual Local Area Network ID (VLAN ID) in an IPOEOVLAN, a Permanent Virtual Connection (PVC) in an IPOEOA etc. For Point-to-Point Protocol (PPP), every user is an independent data link. The management for multicasting characteristics corresponding to the data link layer includes, for example, limiting the number of members of a multicasting group when applying a core edge network device such as an Edge Service Router (ESR), or forwarding only one datagram for all members of the same multicasting group at the same data link to save the resources of network bandwidth etc.

The user layer control blocks are used to manage multicasting characteristics at user level, which includes two main aspects: managing user's joining or leaving a multicasting group and managing of charging a particular user and forwarding multicasting packets, which will be described in more detail later.

The second step of the present invention, that is, how to establish the data relationship among three kinds of control blocks, is a key point of the invention. A three-dimensional linking-list can be used to establish the above-mentioned data relationship, and other linking-list structures or a database structure etc. can be used instead. FIG. 1 shows the structure of a three-dimensional linking-list. The three dimensions are data link (including interface), multicasting group and user IP. In detail, since all control blocks are linked with linking-lists or arrays, every user layer control block can be searched through any of the data link (including interface), the multicasting group and the user ID. The index relationship ensures three-level management can be achieved with the data structure, that is, multicasting characteristics can be respectively managed at interface level, data link layer and user layer. In this way, the management for multicasting groups can be flexible and effective.

Reference to FIG. 1, the interface of net (IFNET) is a network interface control block for recording interface information. The interface layer control blocks according to the invention, i.e. the interface multicasting control blocks as shown in FIG. 1, are linked to the IFNET. In other words, an index mode for multicasting groups is added in the IFNET with a pointer. In this way, interface control blocks can be effectively managed by means of the management module for interfaces in the operating system of a network device. Also as shown in FIG. 1, the control blocks L1, L2, L3 and L4 at data link layer and control blocks G1, G2 and G3 at user layer are respectively the data link layer control blocks for data links 1, 2, 3 and 4 and the user layer control blocks for multicasting groups 1, 3 and 4. The data link layer control blocks and user control blocks are respectively used to establish the index relationship between data link layer and users and between multicasting group IPs and users. By means of the two index relationships, a particular user can be searched and fixed on by either the data link layer or multicasting group IP. The hash table of data link layer and the hash table of multicasting group IP can be used to increase searching efficiency. In detail, corresponding key of the hash table can be quickly calculated with particular hash arithmetic for data link index or multicasting group IP. Next, a particular data link layer control block or user layer control block can be found through hash table index with keys.

After the data relationship among three layers of control blocks has been established, the accurate control at user level can be achieved. For example, for multicasting group members in the same data link where the sender is located, only one multicasting packet is sent to the members; and for general multicasting group members, with cluster technique a data link layer device can attend the management of multicasting and devices for forwarding multicasting packets can be controlled. During forwarding a multicasting packet, the devices for forwarding multicasting packets will record the data flow, so multicasting application of a particular user can be recorded and the user can be charged.

As for the management for user's joining or leaving a multicasting group, it includes searching the interface layer control blocks, the data link layer control blocks and the user layer control blocks sequentially after receiving a multicasting report packet. A specific processing is as follows.

First, according to the IFNET that has received the multicasting report packets, a certain interface multicasting control block, i.e. a certain interface layer control block, will be found and characteristics of the multicasting group will be judged to determine whether the successive processing will be continued; if so, process the next steps, otherwise not process the next steps.

According to the linked-lists under the interface control blocks and the data link characteristics of the received packets, a certain data link layer control block will be found and the data link characteristics of the multicasting group will be determined. If the multicasting application can be applied at this data link, process the next step; otherwise not process the next step. If no data link layer control block can be found, then a new data link control block can be added at that data link.

According to the multicasting group IP and user attributes (such as user identification), a certain user layer control block will be found, then the management of user's joining or leaving the multicasting group will be made, that is, corresponding user information can be added, deleted or modified in the user layer control block.

Although the present invention has been described with reference to specific exemplary embodiments, it will be evident that various modification and changes can be made to these embodiments without departing from the broader spirit of the invention as set forth in the claims. Accordingly, the specification and drawings are to be regarded in an illustrative sense rather than in a restrictive sense. The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A multi-layer user management method implemented by a computer for multicasting proxy, comprising:

dividing a user management for multicasting groups into three layers: management at an interface layer for controlling multicasting characteristics corresponding to interfaces, management at a data link layer for controlling multicasting characteristics corresponding to data links, and management at user layer for controlling multicasting characteristics corresponding to particular users, and at each layer, setting control blocks that respectively comprise multicasting characteristic data corresponding to said each layer;

establishing a data relationship among the three layers of control blocks; and controlling a network device to manage a user of a group of the multicasting groups using the data relationship among the three layers of control blocks including:

finding a first interface layer control block according to a data structure of an interface of net (IFNET) that has received a multicasting packet; then judging multicasting characteristics of the multicasting groups which are defined in the found interface layer control block to determine whether to continue successive processing; if so, performing the next steps, otherwise ending;

finding a first data link layer control block according to a data relationship between data link layer control blocks and the first interface layer control block; then judging multicasting characteristics corresponding to data links of the multicasting packet to determine whether to continue successive processing; if so, performing the next step, otherwise ending; and finding a first user layer control block according to a multicasting group IP and user attributes; then adding, deleting or modifying corresponding user information in the first user layer control block.

2. The method of claim 1, wherein said controlling multicasting characteristics corresponding to interfaces includes: judging whether to allow multicasting applications at an interface, judging whether to allow multicasting applications at a user side or a network side, judging whether to allow tying multicasting resources or multicasting groups, limiting the number of members of a multicasting group or limiting the number of multicasting groups.

3. The method of claim 1, wherein said controlling multicasting characteristics corresponding to data links is limiting the number of members of a multicasting group when employing a core edge layer network device.

4. The method of claim 1, wherein said controlling multicasting characteristics corresponding to data links is forwarding only one multicasting packet for all members of the same multicasting group at the same data link when forwarding data.

5. The method of claim 1, wherein the data relationship is established through a linking-list structure or a relational database structure.

6. The method of claim 1, wherein the data relationship is established through a three-dimensional linking-list data structure which links each control block with linking-lists or arrays; the three dimensions of the three-dimensional linking-list data structure comprise data link including interface, multicasting group and user IP.

7. The method of claim 1, further comprising:
if no proper data link control block is found when finding a first data link control block, adding a new data link layer control block; and
establishing a data relationship among interface layer control blocks, user layer control blocks and the new data link layer control block.

8. The method of claim 1, wherein said managing the user of the multicasting group is forwarding control, further comprising:
making data link layer devices attend multicasting management with device cluster control technique.

9. The method of claim 1, wherein said managing the user of the multicasting group is performing flow charging control to the user of the multicasting group; and
said performing flow charging control to the user of the multicasting group comprises:
recording the flow of multicasting packets having been forwarded with a device forwarding program and charging the user when the user receives the multicasting packets.

10. The method of claim 3, wherein the core edge layer network device is an Edge Service Router (ESR).

11. A multi-layer user management method implemented by a computer for multicasting proxy, comprising:
dividing a user management for a multicasting group into an interface layer management, a data link layer management, and an user layer management,
controlling multicasting characteristics corresponding to multicast interfaces via the interface layer management,
controlling multicasting characteristics corresponding to data links via the data link layer management, and
controlling multicasting characteristics corresponding to users via the user layer management,
providing a control block that is for and that has multicasting characteristic data corresponding to each of the interface layer management, the data link layer management, and the user layer management;
establishing a data relationship among the control blocks; and
controlling a network device to manage a user of the multicasting group by using the data relationship including:
finding a first interface layer control block according to a data structure of an interface of net (IFNET) that has received a multicasting packet; then judging multicasting characteristics of the multicasting groups which are defined in the found interface layer control block to determine whether to continue successive processing; if so, performing the next steps, otherwise ending;
finding a first data link layer control block according to a data relationship between data link layer control blocks and the first interface layer control block; then judging multicasting characteristics corresponding to data links of the multicasting packet to determine whether to continue successive processing; if so, performing the next step, otherwise ending; and
finding a first user layer control block according to a multicasting group IP and user attributes; then allowing multicasting at the network device including adding, deleting or modifying corresponding user information in the first user layer control block.

* * * * *